(12) United States Patent
Rumohr

(10) Patent No.: US 10,986,780 B2
(45) Date of Patent: Apr. 27, 2021

(54) COTTON CLEANER SAW DRUM WITH BUFFER RING

(71) Applicant: DEERE & COMPANY, Moline, IL (US)

(72) Inventor: John O. Rumohr, Pleasant Hill, IA (US)

(73) Assignee: Deere & Company, Moline, IL (US)

( * ) Notice: Subject to any disclaimer, the term of this patent is extended or adjusted under 35 U.S.C. 154(b) by 187 days.

(21) Appl. No.: 16/409,154

(22) Filed: May 10, 2019

(65) Prior Publication Data

US 2020/0352103 A1  Nov. 12, 2020

(51) Int. Cl.
*A01D 46/08* (2006.01)
(52) U.S. Cl.
CPC .................................. *A01D 46/08* (2013.01)
(58) Field of Classification Search
CPC . A01D 46/08; D01B 1/06; D01G 9/02; D01G 9/06; D01G 9/20
USPC ............................................................ 56/28
See application file for complete search history.

(56) References Cited

U.S. PATENT DOCUMENTS

| 2,123,405 | A |   | 7/1938 | Court |
|---|---|---|---|---|
| 4,606,177 | A | * | 8/1986 | Schlueter ............... A01D 46/08 19/64.5 |
| 6,159,094 | A | * | 12/2000 | Deutsch ................. A01D 46/08 460/98 |
| 6,539,585 | B1 | * | 4/2003 | Anthony .................. D01B 1/04 19/39 |
| 9,763,387 | B2 |   | 9/2017 | Goering |
| 2017/0347525 | A1 |   | 12/2017 | Goering et al. |
| 2018/0187335 | A1 | * | 7/2018 | Thomas ................... D01B 1/02 |
| 2018/0340271 | A1 | * | 11/2018 | Rumohr ................. A01D 46/12 |

* cited by examiner

*Primary Examiner* — Thomas B Will
*Assistant Examiner* — Matthew Ian Neal

(57) ABSTRACT

A cotton cleaner for cleaning cotton harvested by a cotton stripper comprises grid bars, a saw drum, and a buffer ring. The saw drum is positioned in proximity to the grid bars and rotatable about an axis of rotation of the saw drum for saw teeth of the saw drum to remove cotton from harvested cotton plant material that passes between the saw drum and the grid bars. The buffer ring is supported by and disposed around the saw drum such that an outer diameter of the buffer ring is greater than an outer diameter of the saw teeth for contact of a grid bar of the grid bars with the buffer ring upon deflection of that grid bar toward the saw drum.

8 Claims, 8 Drawing Sheets

COTTON CLEANER SAW DRUM WITH BUFFER RING

FIELD OF THE DISCLOSURE

The present disclosure relates to a cotton cleaner for a cotton stripper. More particularly, the present disclosure relates to a cotton cleaner with a saw drum and grid bars.

BACKGROUND OF THE DISCLOSURE

A cotton stripper is a type of cotton harvester that harvests cotton by stripping the cotton plant so as to remove entire bolls, branches, and leaves. Rocks, chunks of wood, and other debris may be picked up as well by the cotton stripper. The harvested cotton plant material, as well as any other debris, is advanced to a cotton cleaner of the cotton stripper. The cotton cleaner (a burr extractor) separates the seed cotton from the rest of the harvested cotton plant material and other debris and advances the seed cotton to be baled or otherwise collected.

SUMMARY OF THE DISCLOSURE

According to an aspect of the present disclosure, a cotton cleaner for cleaning cotton harvested by a cotton stripper comprises grid bars, a saw drum, and a buffer ring. The saw drum comprises saw teeth. The saw drum is positioned in proximity to the grid bars and rotatable about an axis of rotation of the saw drum for the saw teeth to remove cotton from harvested cotton plant material that passes between the saw drum and the grid bars. The buffer ring is supported by and disposed around the saw drum such that an outer diameter of the buffer ring is greater than an outer diameter of the saw teeth for contact of a grid bar of the grid bars with the buffer ring upon deflection of that grid bar toward the saw drum. In this way, the deflected grid bar contacts the buffer ring instead of the saw teeth.

The above and other features will become apparent from the following description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
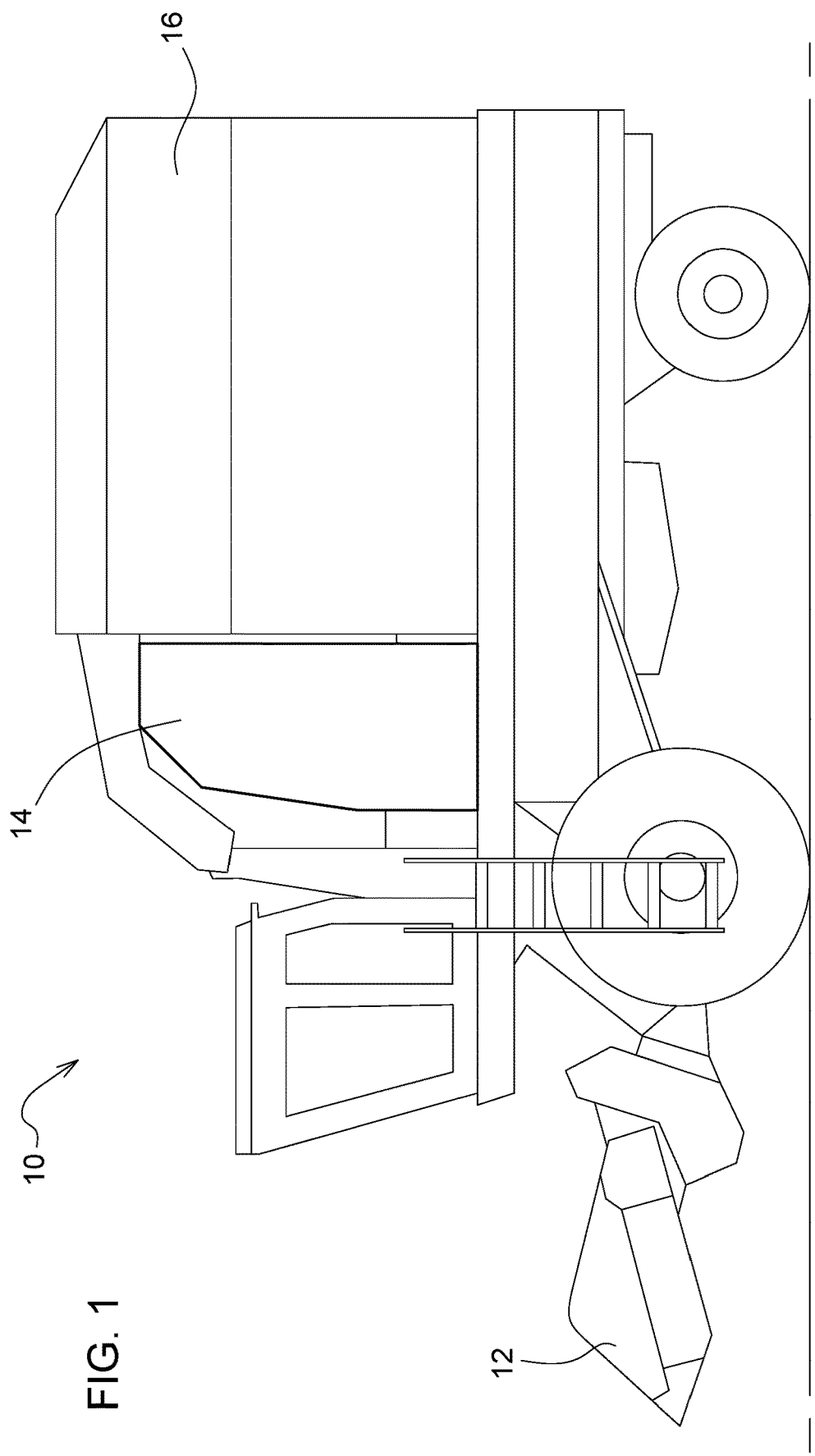
FIG. 1 is a diagrammatic view showing a cotton stripper with a cotton cleaner.

Referring to FIG. 1, there is shown a cotton stripper 10. The cotton stripper 10 has a multi-row header 12 for harvesting cotton plant material, a cotton cleaner 14 for removing cotton (lint and seed) from the rest of the harvested cotton plant material and any debris, and a collector 16 for collecting the cleaned cotton. The header 12 may be any suitable cotton stipper header. The collector 16 may be configured as a round module baler or a basket.

Figure 2:
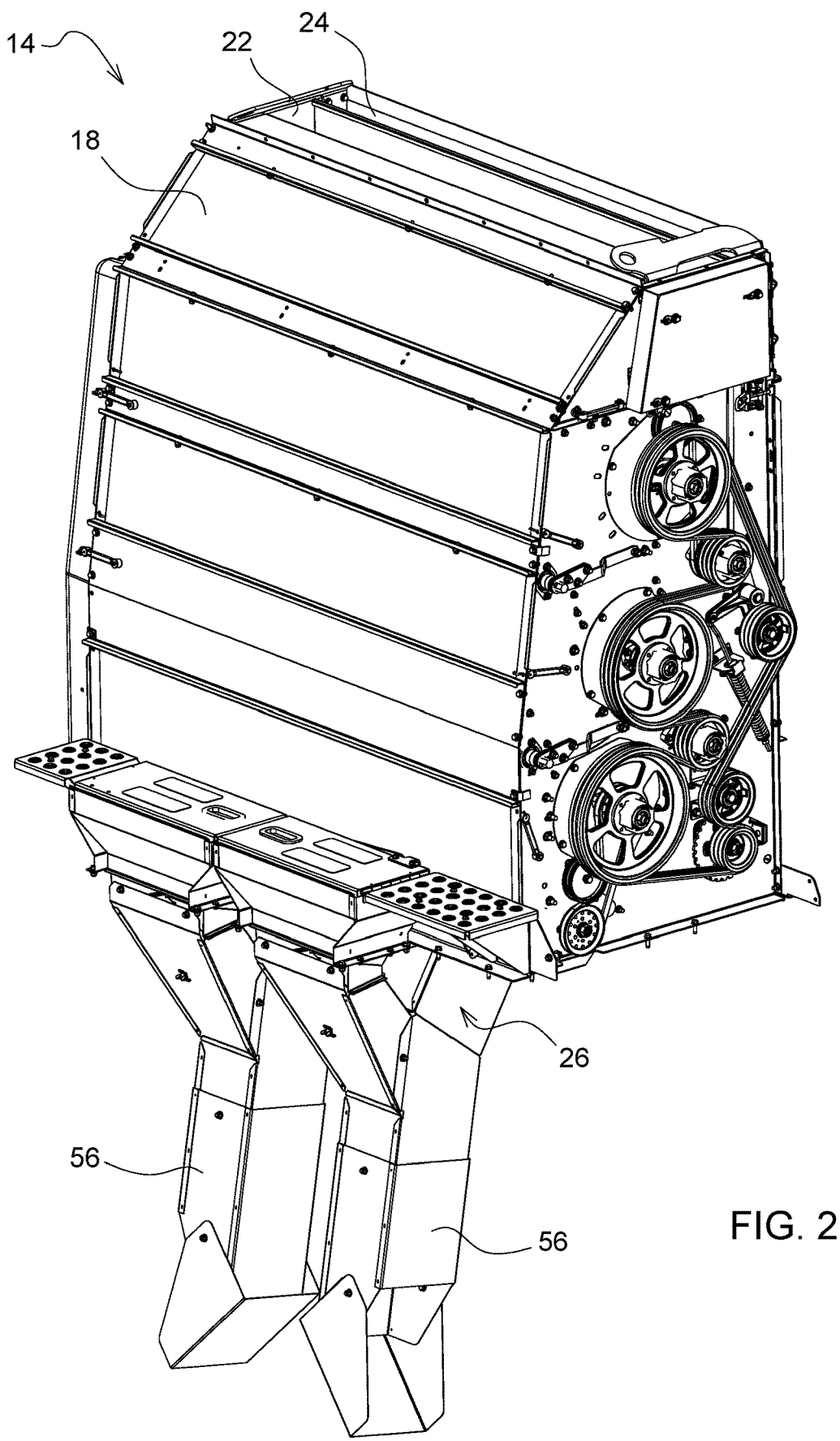
FIG. 2 is a perspective view showing the cotton cleaner.
Figure 3:
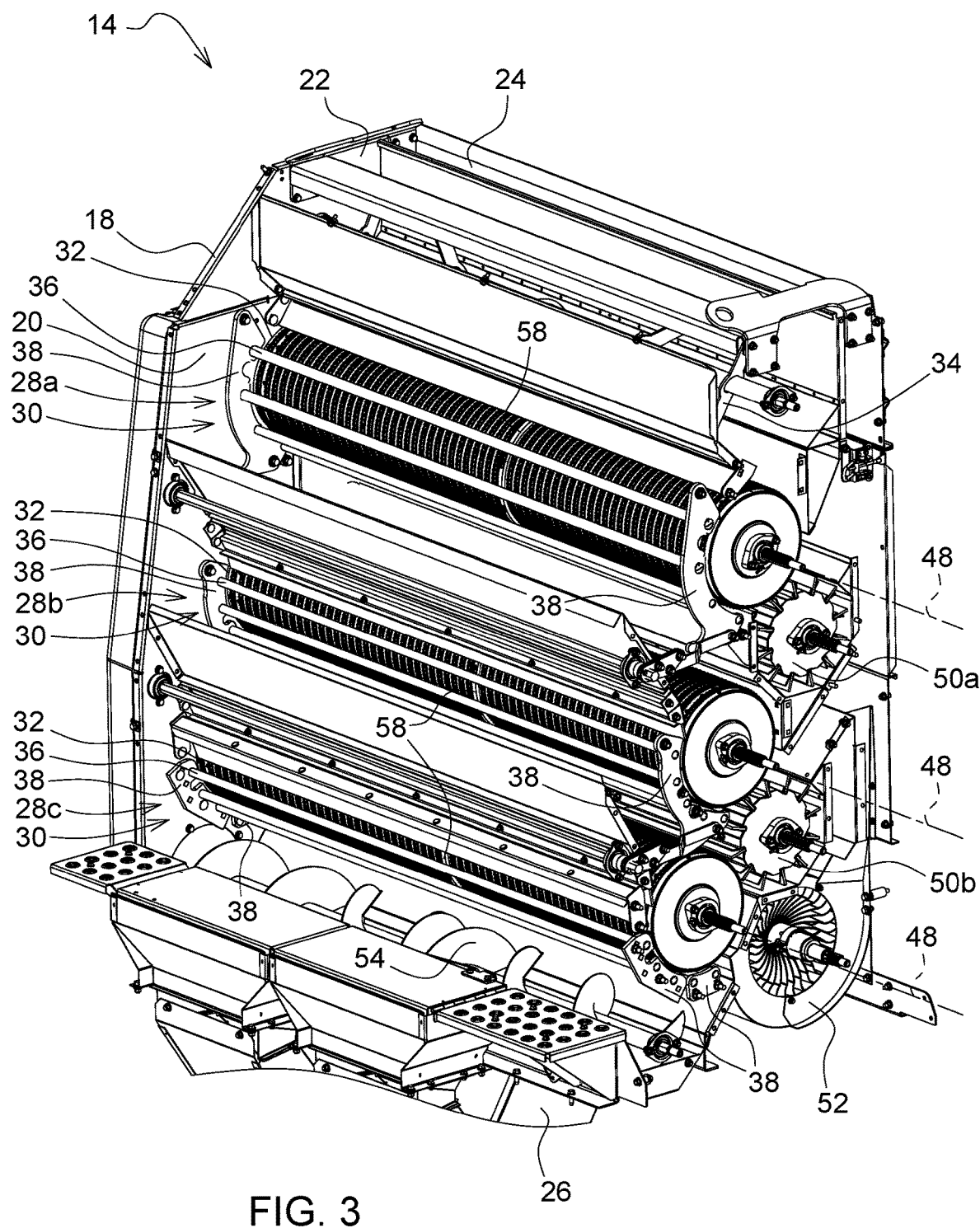
FIG. 3 is a perspective view showing the cotton cleaner with portions broken away.
Figure 4:
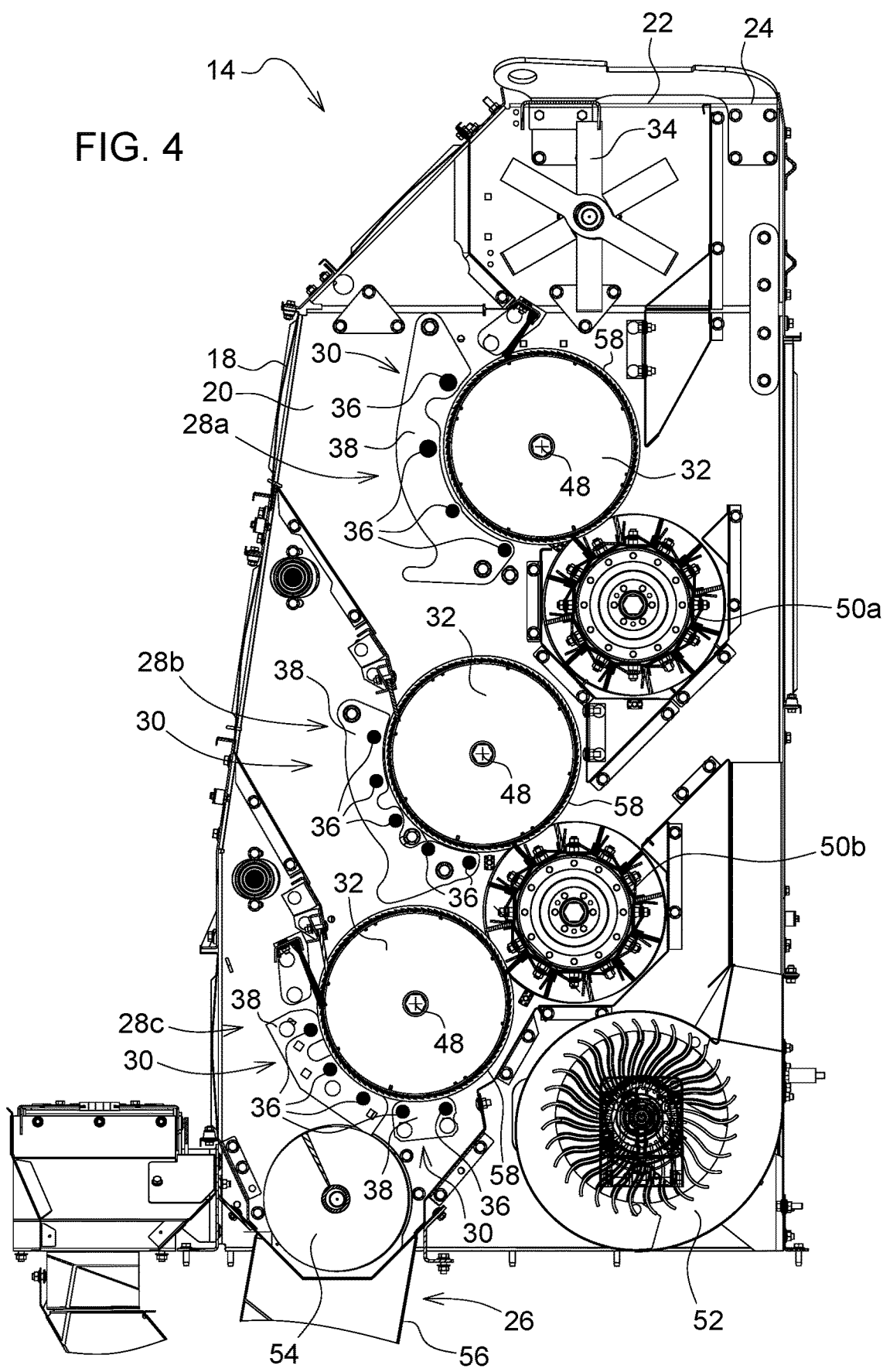
FIG. 4 is a side elevational view showing the cotton cleaner with portions broken away.

Referring to FIGS. 2-4, the cotton cleaner 14 has a housing 18 and various components positioned in an interior region 20 of the housing 18. The housing 18 has an inlet 22 connected to the header 12 to receive harvested cotton plant material therefrom into the cotton cleaner 14, a clean-cotton outlet 24 for discharge of cleaned cotton from the cotton cleaner 14 to the collector 16, and a trash outlet 26 for discharge of residual harvested cotton plant material and other debris from the cotton cleaner 14.

The cleaner 14 has one or more cleaning stages 28, each cleaning stage 28 including a grid bar assembly 30 and a saw drum 32, both of which are positioned in the interior region 20. Illustratively, the cleaner 14 has three successive cleaning stages 28 for enhanced cleaning of the harvested cotton plant material: a first or upper cleaning stage 28a, a second or middle cleaning stage 28b, and a third or lower cleaning stage 28c. A beater 34 of the cleaner 14 is positioned in the interior region 20 and advances the harvested cotton plant material toward the first cleaning stage 28a. The first cleaning stage 28a removes most of the cotton (seed cotton) from the harvested cotton plant material. As such, the saw drum 32 of the first cleaning stage 28a may be referred to the primary saw drum. The second and third cleaning stages 28b, 28c further remove remaining cotton (seed cotton) from the harvested cotton plant material. As such, the saw drums 32 of the second and third cleaning stages 28b, 28c may be referred to as reclaimer saw drums. The third cleaning stage 28c has a second grid bar assembly 30 adjacent to the other grid bar assembly 30.

Figure 5:
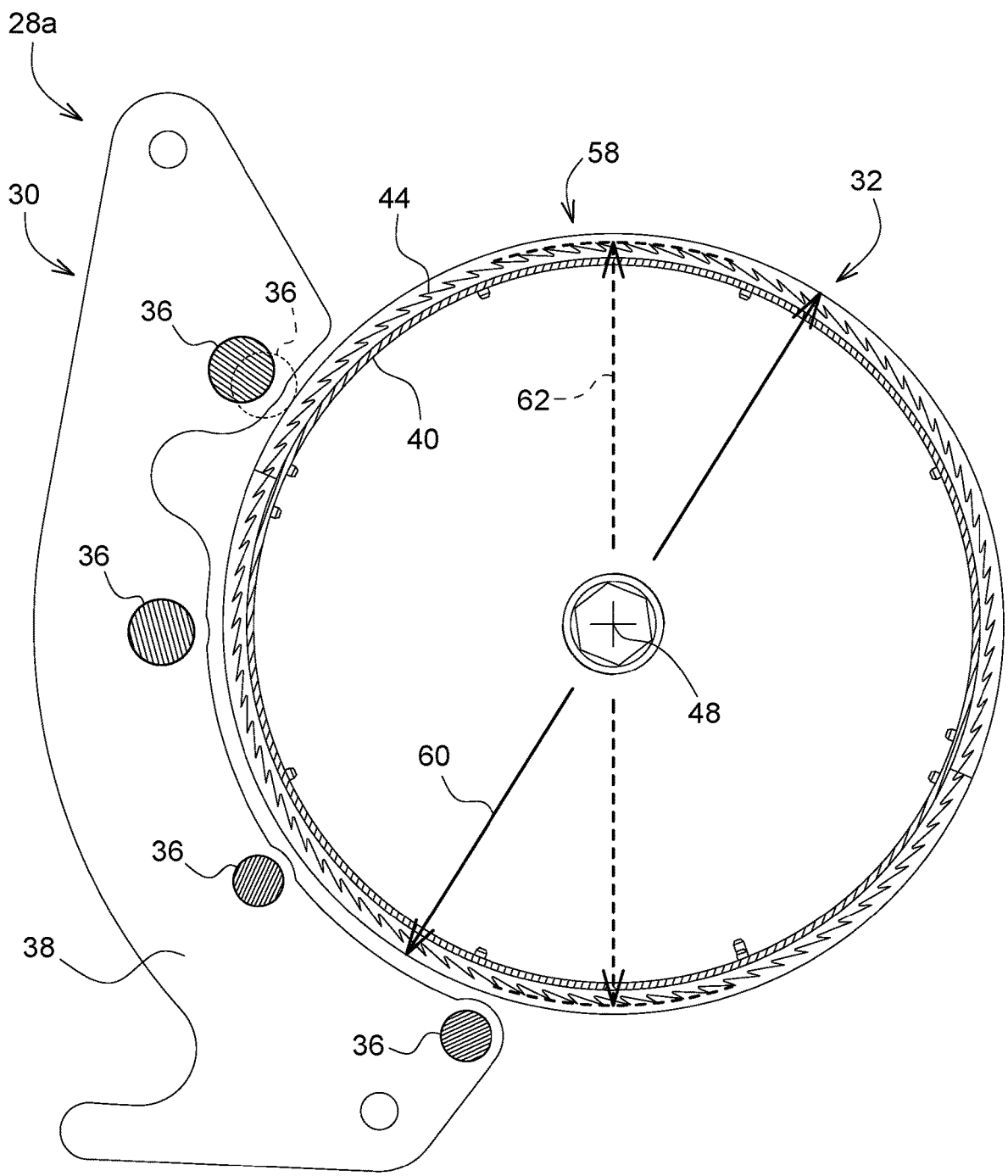
FIG. 5 is an enlarged side elevational view showing a first or upper cleaning stage of the cotton cleaner with grid bars, a saw drum, and a buffer ring, and showing a deflected grid bar (in phantom) of the grid bars striking the buffer ring instead of saw teeth of the saw drum.

Referring to FIG. 5, each grid bar assembly 30 includes a plurality of grid bars 36 and a pair of end plates 38. The grid bars 36 are horizontal and parallel to one another. An end of each grid bar 36 is attached to a respective end plate 38. The end plates 38 are mounted to a pivot frame attached to the housing 18.

The grid bars 36 are spaced apart from one another. For example, the spacing between the grid bars 36 of the first, second, and third cleaning stages 28a, 28b, and 28c may be about ⅝ inch, about ½ inch, and about ⅜ inch, respectively.

The diameter of the grid bars 36 may be different between two or more of the cleaning stages 28a, 28b, 28c. For example, the diameter of the grid bars of the first cleaning stage 28a may be about 1⅛ inch, and the diameter of the grid bars of the second and third cleaning stages may be about 1 inch.

Each saw drum 32 includes a drum cylinder 40, internal plates 42, and saw teeth 44. The drum cylinder 40 is a right circular cylindrical tube in which the circular internal plates 42 are positioned to reinforce the drum cylinder 40. The saw teeth 44 may be arranged in rows (e.g., about ½ inch thick axially) disposed circumferentially about the drum cylinder 40 and attached to the drum cylinder with fasteners 46 (e.g., self-tapping screws—threads not shown for ease of illustration) received in respective holes formed (e.g., punched) in the drum cylinder 40. Each row of saw teeth 44 includes two semi-circle pieces that cooperate to extend around and are positioned on the drum cylinder 40. Another suitable number of pieces may be used to form a row of saw teeth 44.

With respect to each cleaning stage 28a, 28b, 28c, the saw drum 32 is positioned in proximity to and spaced apart from the grid bars 36 of the grid bar assembly 30 (the two grid bar assemblies 30 in the case of the stage 28c). The grid bars 36 are arranged in concave relationship to the saw drum 32. The saw drum 32 is rotatable about an axis of rotation 48 of the saw drum 32 for the saw teeth 44 to remove cotton from harvested cotton plant material that passes between the saw drum 32 and the grid bars 36.

Referring to FIG. 4, the cleaner 14 includes a number of doffers 50.

Illustratively, the cleaner 14 has two doffers 50, each with a plurality of circumferentially-spaced brushes (bristles shown collectively for ease of illustration). The first or upper doffer 50a removes cotton from the saw drum 32 of the first cleaning stage 28a. The second or lower doffer 50b removes cotton from the saw drums 32 of the second and third cleaning stages 28b, 28c.

The cleaner 14 has an air blower 52. The air blower 52 generates a flow of air to advance cotton removed by the doffers 50a, 50b through the clean-cotton outlet 24 to the collector 16. The blower 52 may be, for example, a centrifugal fan or other suitable device for generating a flow of air.

Trash discharged by the third cleaning stage 28c exits the cleaner through the trash outlet 26. The trash encounters an auger 54 which directs the material to toward a pair of discharge chutes 56 of the outlet 26 for discharge from the cleaner 14.

Figure 6:
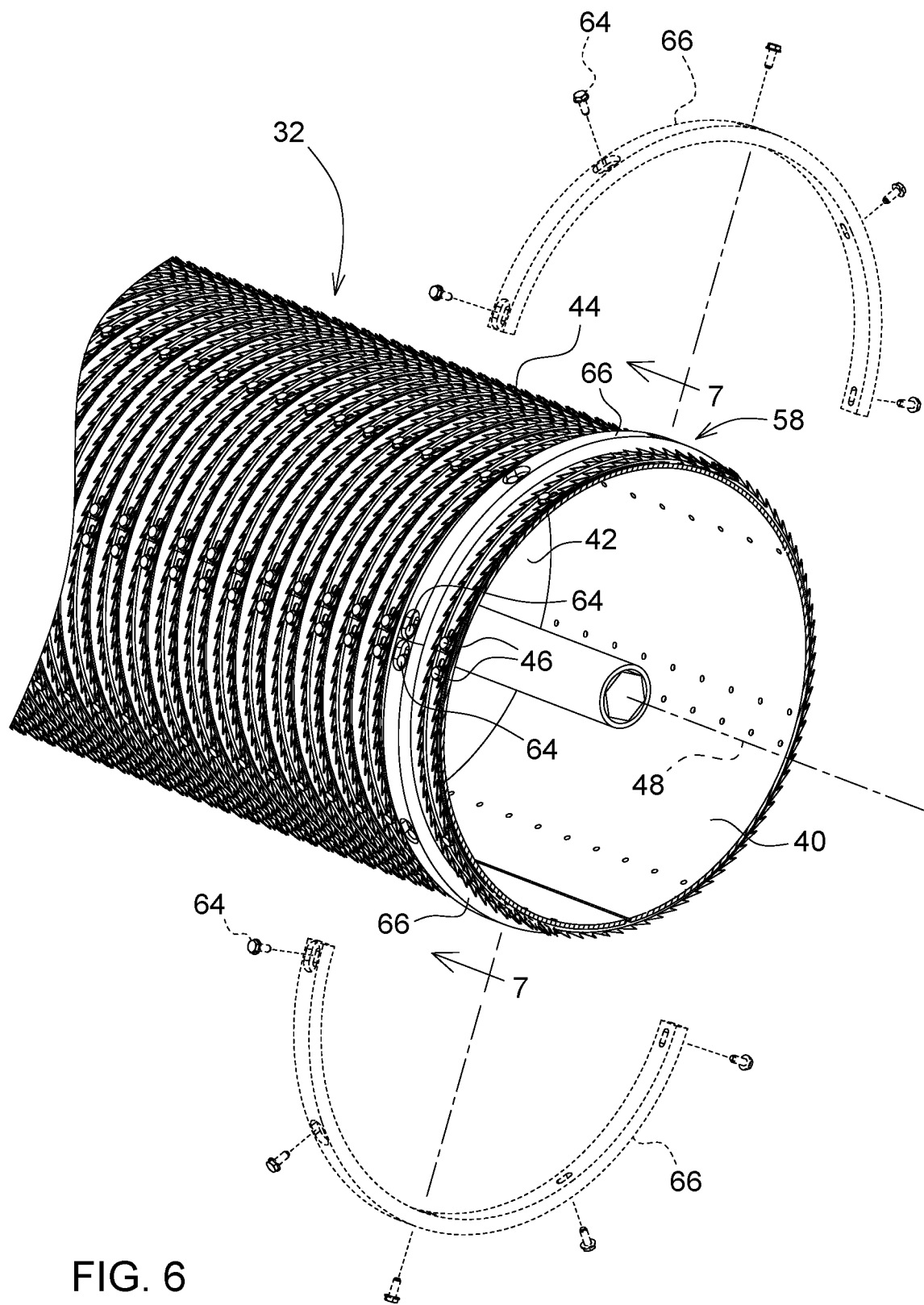
FIG. 6 is a perspective view showing that the buffer ring comprises two semi-circle pieces.

Referring to FIGS. 5 and 6, each cleaning stage 28a, 28b, 28c includes a buffer ring 58, as shown, for example, with respect to the upper cleaning stage 28a. The buffer ring 58 is supported by and disposed around the saw drum 32 such that an outer diameter 60 of the buffer ring 58 is greater than an outer diameter 62 of the saw teeth 44 for contact of a grid bar 36 with the buffer ring 58 upon deflection of that grid bar 36 toward the saw drum 32.

The grid bars 36 are elongated (e.g., about 75 inches in length) and correspondingly deflectable toward and away from the saw drum 32. A slug of cotton (and possibly other material) may enter between the saw drum 32 and the grid bars 36 causing one or more of the grid bars 36 to deflect away from the saw drum 32. Upon passage of the slug, the deflected grid bar 36 may snap or otherwise deflect in the opposite direction toward the saw drum 32. The deflected grid bar 36 may then strike or otherwise contact the buffer ring 58 instead of the saw teeth 44 of the saw drum 32 (grid bar 36 shown in phantom contacting buffer ring 58). Contact between a grid bar 36 and the saw teeth 44 may cause damage to both the grid bar 36 (e.g., markings, gouges) and the saw drum 32 (e.g., dulled or broken saw teeth 44). Use of the buffer ring 58 can avoid such damage and associated maintenance.

Figure 7:
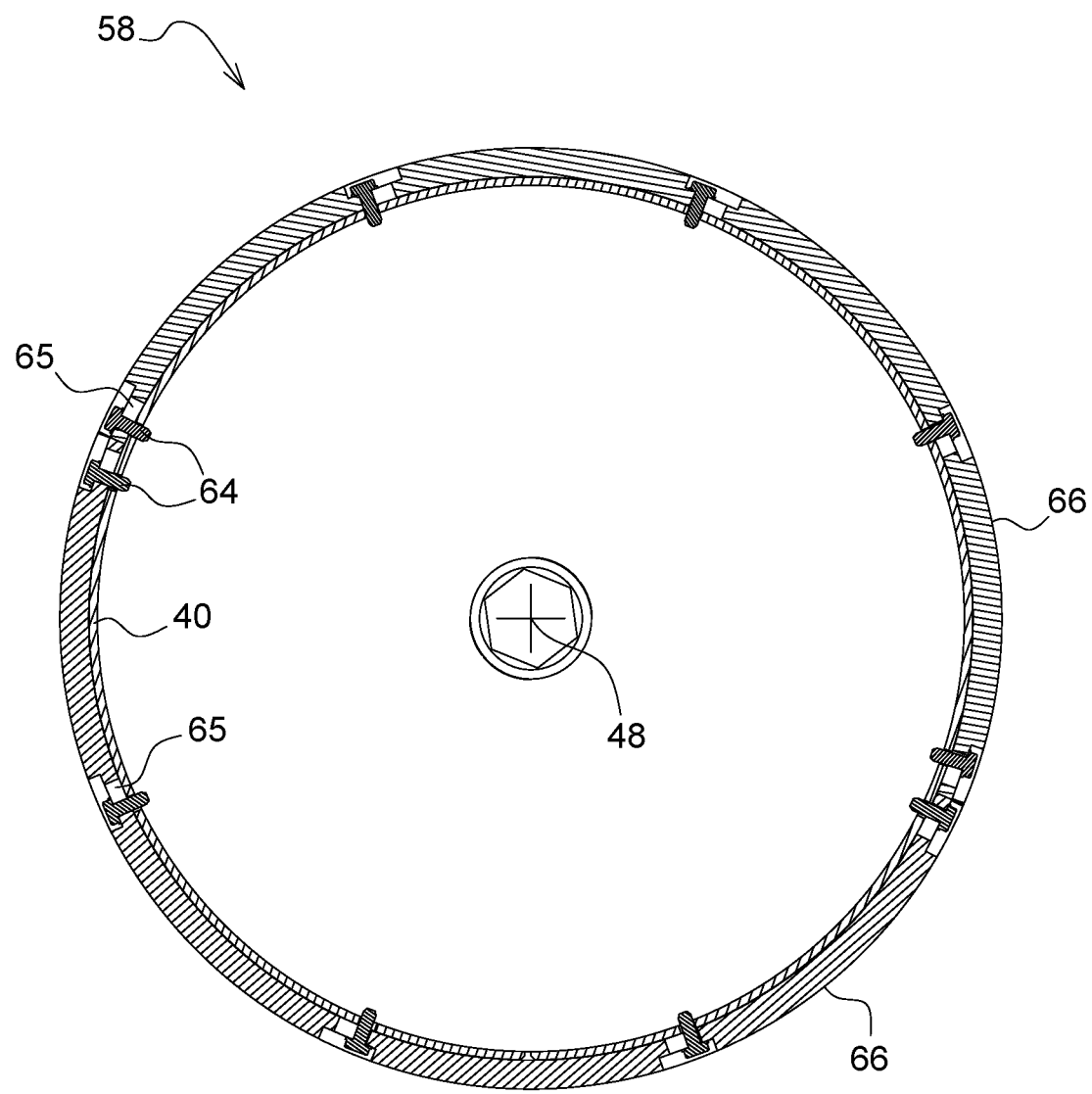
FIG. 7 is a sectional view taken along lines 7-7 of FIG. 6 showing countersunk fasteners attaching the semi-circles pieces to the saw drum.

Referring to FIGS. 6 and 7, the buffer ring 58 is attached to the saw drum 32. The buffer ring 58 is positioned on the drum cylinder 40 so as to extend around the drum cylinder 40. A row of saw teeth 44 may be omitted from the saw drum 32, making space for the buffer ring 32. The cleaner 14 has fasteners 64 (e.g., screws—threads not shown for ease of illustration) attaching the buffer ring 58 to the saw drum 32. The fasteners 64 are countersunk into the buffer ring 58. The fasteners 64 are positioned in respective fastener-receiving holes 65 in the buffer ring 58.

Figure 8:
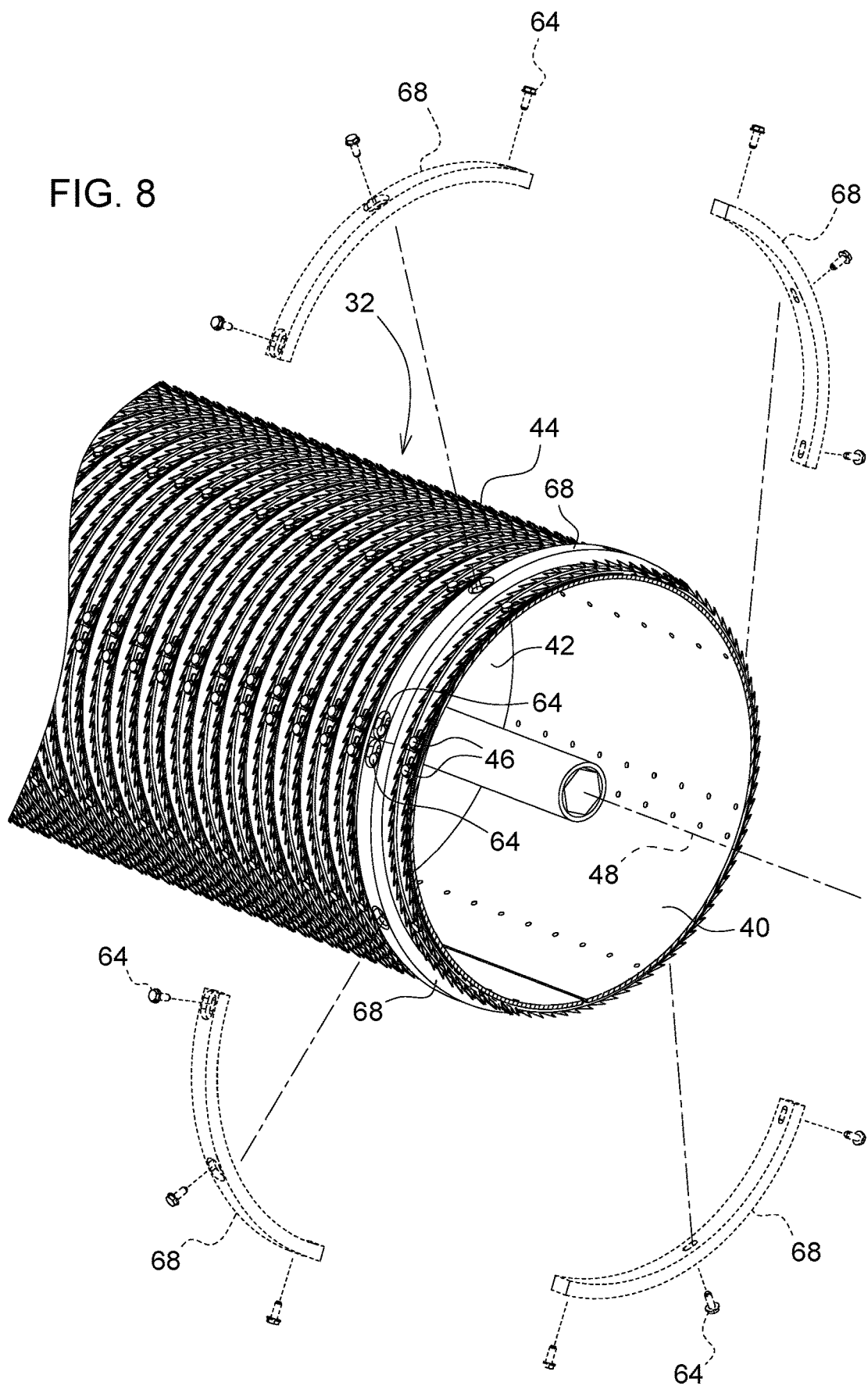
FIG. 8 is a perspective view showing an alternative embodiment of the buffer ring with four quarter-circle pieces.

Referring to FIGS. 6 and 8, the buffer ring 58 may be constructed in a variety of ways. Illustratively, as shown, for example, in FIG. 6, the buffer ring 58 includes two semi-circle pieces 66 that cooperate to extend around the saw drum 32 to form the ring shape of the buffer ring 58 and are positioned on the saw drum 32 (e.g., the drum cylinder 40). In other embodiments, as shown, for example, in FIG. 8, the buffer ring 58 may include four quarter-circle pieces 66 that cooperate to extend around the saw drum 32 to form the ring shape of the buffer ring 58 and are positioned on the saw drum 32 (e.g., the drum cylinder 40). Other numbers of pieces may be used to form the ring shape.

The buffer ring 58 may be made of a wear-resistant material. The material is configured to resist wear from grid bar contact, debris, cotton, dust, and other materials. The wear-resistant material may be, for example, plastic or other non-ferrous material for wear resistance. The plastic material may be, for example, a hard plastic material, or a soft plastic material to absorb impacts such as from rock or wood.

Referring to FIG. 3, the buffer ring 58 may be positioned axially at or near the middle of the saw drum 32 relative to the axis 48. In some embodiments, the buffer ring 58 may be offset from the middle axially left or right of middle. The buffer rings 58 of the cleaning stages 28a, 28b, 28c may be positioned at the same axial location on the respective saw drum 32, or one or more buffer rings 32 of the cleaning stages 28a, 28b, 28c may be positioned at different axial location(s) on the respective saw drum 32.

Referring to FIGS. 3 and 4, each cleaning stage 28a, 28b, 28c has one or more brushes arranged to contact the saw drum 32. Each brush urges cotton against the saw drum 32 to assist engagement with the cotton by the saw teeth 44. The brush is flexible to allow foreign objects (e.g., rocks) to pass through the brush. Illustratively, the first cleaning stage 28a has one brush, while the second and third cleaning stages 28b, 28c each have two brushes. For ease of illustration, the brushes are shown in their nominal, undeflected position (one of ordinary skill in the art will recognize that the brushes would be deflected by contact with the saw drums 32), and the bristles are shown collectively.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A cotton cleaner for cleaning cotton harvested by a cotton stripper, the cotton cleaner comprising:
   grid bars,
   a saw drum comprising saw teeth, the saw drum positioned in proximity to the grid bars and rotatable about an axis of rotation of the saw drum for the saw teeth to remove cotton from harvested cotton plant material that passes between the saw drum and the grid bars, and
   a buffer ring supported by and disposed around the saw drum such that an outer diameter of the buffer ring is greater than an outer diameter of the saw teeth for contact of a grid bar of the grid bars with the buffer ring upon deflection of that grid bar toward the saw drum.

2. The cotton cleaner of claim 1, wherein the buffer ring comprises two semi-circle pieces that cooperate to extend around the saw drum.

3. The cotton cleaner of claim 1, wherein the buffer ring comprises four quarter-circle pieces that cooperate to extend around the saw drum.

4. The cotton cleaner of claim 1, comprising fasteners attaching the buffer ring to the saw drum.

5. The cotton cleaner of claim 4, wherein the fasteners are countersunk into the buffer ring.

6. The cotton cleaner of claim 1, wherein the buffer ring is made of a polymer.

7. The cotton cleaner of claim 1, wherein the buffer ring is positioned axially at a middle of the saw drum relative to the axis of rotation.

8. The cotton cleaner of claim 1, wherein the buffer ring is offset axially from a middle of the saw drum relative to the axis of rotation.

\* \* \* \* \*